UNITED STATES PATENT OFFICE.

GÖSTA EKSTRÖM, OF LIMHAMN, SWEDEN.

PROCESS FOR MAKING GRAPE-SUGAR.

970,029.  Specification of Letters Patent. Patented Sept. 13, 1910.

No Drawing.  Application filed August 22, 1907. Serial No. 389,608.

*To all whom it may concern:*

Be it known that I, GÖSTA EKSTRÖM, engineer, who is a citizen of the Kingdom of Sweden, residing at Limhamn, Sweden, have invented a new and useful Process for Making Grape-Sugar; and I do hereby declare the following to be a full, clear, and exact description of the same.

My invention relates to a new and improved process for making grape sugar.

It relates particularly to a process for making grape sugar from acid cellulose.

To carry out my invention, I first prepare my acid cellulose, and I have found the following method to produce a satisfactory product. Take saw dust (or some other finely-divided cellulose containing material) and sulfuric acid of 70 per cent. and stir them together for about 20 minutes at an ordinary temperature (about 20° C.). Through the operation of the acid the cellulose matter becomes liquid, while a formation of acid-cellulose takes place. By treating acid cellulose with concentrated acid (during which precautions may or may not be taken), the acid-cellulose will precipitate like a jelly, which remains when the sulfuric acid, now (through dilution with the water) only 30 per cent., is removed. To the remaining acid-cellulose matter, which still retains some acid, water is added, till it contains about 1 per cent. of sulfuric acid. The acid cellulose is, in reality, a unity, not a compound substance. It contains the carboxyl group, and has consequently the character of an acid, it reacts sour and possesses no aldehyde qualities.

The above described process of producing acid cellulose is described in my pending application, Serial No. 352105, filed Jan. 14th, 1907.

By treating the acid cellulose with acid it is transformed into cellose, soluble in water. By adding water so as to dilute the acid and boiling afterward under atmospheric pressure the cellose is then converted into grape sugar, which after precipitation of the acid is obtained in an aqueous solution. As at present practiced, 1 part (by weight) of acid cellulose is mixed in a suitable apparatus with 1–1¼ part concentrated sulfuric acid (70–95%) and the whole kneaded, until a homogeneous dense paste is the result. During the aforesaid mixing and kneading, the composition is subjected to heat of about, but not more than, 100° C., and kept at said temperature for some time, while also being stirred continuously. The acid cellulose will then be found to have been converted into cellose soluble in water, and, upon addition of water (preferably in quantity from three to four times—by weight—of the paste), so as the acid is diluted, the mixture is boiled, under pressure of the atmosphere, for from one-half to one hour. Upon cessation of the boiling, the mixture is filtered, the acid is neutralized, by the addition of chalk for instance, and the grape sugar can then be separated from the solution, or alcohol can be produced by fermentation of the sugar. Other concentrated mineral acids may also be used instead of sulfuric acid for the transforming of acid cellulose into grape sugar.

What I claim is:

A process for obtaining grape sugar from acid cellulose, consisting in mixing acid cellulose with sufficient concentrated mineral acid to form a paste, meanwhile heating the mixture to not more than 100° C. until the acid cellulose is converted into cellose soluble in water, adding water thereto and boiling the whole under pressure of the atmosphere, precipitating the acid by adding a suitable base, and separating out the grape sugar.

In testimony whereof, I have signed my name to this specification in the presence of two subscribing witnesses.

GÖSTA EKSTRÖM.

Witnesses:
F. LEISCHER,
A. PETERSEN.